United States Patent
Okamoto et al.

(10) Patent No.: US 9,441,138 B2
(45) Date of Patent: Sep. 13, 2016

(54) BLOCKED POLYISOCYANATE COMPOSITION, PREPOLYMER COMPOSITION, AND METHOD OF MANUFACTURING THEM, AND THERMALLY DISSOCIATIVE BLOCKING AGENT FOR BLOCKED POLYISOCYANATE COMPOSITION

(71) Applicant: Daiei Sangyo Kaisha, Ltd., Nagoya-shi (JP)

(72) Inventors: Yasushi Okamoto, Nagoya (JP); Shizuka Suzuki, Nagoya (JP)

(73) Assignee: Daiei Sangyo Kaisha, Ltd., Nagoya-shi (JP)

( * ) Notice: Subject to any disclaimer, the term of this patent is extended or adjusted under 35 U.S.C. 154(b) by 0 days.

(21) Appl. No.: 14/658,509

(22) Filed: Mar. 16, 2015

(65) Prior Publication Data
US 2015/0284588 A1    Oct. 8, 2015

Related U.S. Application Data

(63) Continuation of application No. PCT/JP2013/058067, filed on Mar. 21, 2013.

(30) Foreign Application Priority Data

Sep. 18, 2012   (JP) .................. 2012-204890

(51) Int. Cl.
| | |
|---|---|
| *C08G 18/00* | (2006.01) |
| *C09D 175/04* | (2006.01) |
| *C01B 25/30* | (2006.01) |
| *C01D 7/00* | (2006.01) |
| *C08G 18/80* | (2006.01) |
| *C08G 18/64* | (2006.01) |
| *C08G 18/76* | (2006.01) |
| *C08G 18/30* | (2006.01) |

(52) U.S. Cl.
CPC ............. *C09D 175/04* (2013.01); *C01B 25/30* (2013.01); *C01D 7/00* (2013.01); *C08G 18/302* (2013.01); *C08G 18/6484* (2013.01); *C08G 18/7671* (2013.01); *C08G 18/8029* (2013.01)

(58) Field of Classification Search
CPC ...... C09D 175/04; C01B 25/30; C01D 7/00; C08G 18/302; C08G 18/6484; C08G 18/7671; C08G 18/8029
See application file for complete search history.

(56) References Cited

U.S. PATENT DOCUMENTS

| | | | | |
|---|---|---|---|---|
| 3,773,729 A | * | 11/1973 | Wakimoto et al. | C08G 18/0804 204/493 |
| 5,164,421 A | * | 11/1992 | Kiamil | A61L 15/425 521/159 |
| 5,817,732 A | * | 10/1998 | Asahina | C08G 18/3834 524/710 |

* cited by examiner

*Primary Examiner* — Michael L Leonard
(74) *Attorney, Agent, or Firm* — Muskin & Farmer LLC

(57) ABSTRACT

A prepolymer composition and a method for manufacturing them each of which is able to impart a low temperature thermosetting property surpassing the prepolymer of the phenolic resin to a prepolymer as a mixture of a blocked polyisocyanate compound and a polyisocyanate reactive compound, while suppressing generation of a toxic gas impacting on the environment and an unpleasant odor at the time of manufacturing or at the time of thermal curing, and each of which is capable of providing a thermosetting plastic as a thermally cured product thereof to the market at a cost comparable to the phenolic resin, while restraining divergence of the formaldehyde.

10 Claims, 3 Drawing Sheets

| Production of Blocked Polyisocyanate | | Comparative Example 1 | Comparative Example 2 | Comparative Example 3 | Working Example 1 | Working Example 2 | Working Example 3 | Working Example 4 | Working Example 5 |
|---|---|---|---|---|---|---|---|---|---|
| Raw material to be used | MDI | 100 | 100 | 100 | 100 | 100 | 100 | 100 | 100 |
| | ε-caprolactam | 100 | | | | | | | |
| | Sodium hydrogen sulfite | 42 | 42 | 42 | | | | | |
| | Sodium bicarbonate | | | | 57 | 57 | 57 | | |
| | Disodium hydrogen phosphate | | | | | | | 96 | |
| | Ammonium hydrogen sulfite | | | | | | | | 54 |
| | Water | | 100 | 100 | 100 | 100 | 100 | 100 | 100 |
| | Dioxane | | 20 | | | 20 | 20 | | |
| | Acetone | | | 20 | 20 | | | | |
| Reaction temperature (°C) | | 90 | 20 | 20 | 20 | 20 | 5 | 20 | 20 |
| Recovery rate (%) | | 95 | 90 | 93 | 92 | 95 | 97 | 90 | 95 |

FIGURE 2

| Production of Prepolymer Resin | | Comparative Example 1 | Comparative Example 2 | Comparative Example 3 | Working Example 1 | Working Example 2 | Working Example 3 | Working Example 4 | Working Example 5 |
|---|---|---|---|---|---|---|---|---|---|
| Raw material to be used | Blocked polyisocyanate | 100 | 100 | 100 | 100 | 100 | 100 | 100 | 100 |
| | Glucose | 70 | 70 | 70 | 70 | 70 | 70 | 70 | 70 |
| Maximum particle size (μm) | | 20 | 20 | 20 | 20 | 20 | 20 | 20 | 20 |
| Curing temperature (°C) | | 200 | 120 | 125 | 136 | 132 | 130 | 135 | 125 |
| Curing time (sec) | | 179 | 61 | 72 | 35 | 34 | 32 | 32 | 32 |
| Status of occurrence of odor at the time of manufacture | | ε-caprolactam odor | Sulfur dioxide gas odor | Sulfur dioxide gas odor | Odorless | Odorless | Odorless | Odorless | Odorless |
| Status of occurrence of odor at the time of thermal curing | | ε-caprolactam odor | Odorless | Odorless | Odorless | Odorless | Odorless | Odorless | Odorless |

FIGURE 3

BLOCKED POLYISOCYANATE COMPOSITION, PREPOLYMER COMPOSITION, AND METHOD OF MANUFACTURING THEM, AND THERMALLY DISSOCIATIVE BLOCKING AGENT FOR BLOCKED POLYISOCYANATE COMPOSITION

CROSS REFERENCE TO RELATED APPLICATIONS

This application is a "bypass continuation" of PCT/JP2013/058067, filed on Mar. 21, 2013 which claims priority to Japanese Application 2012-204890 filed on Sep. 18, 2012, both of these documents are incorporated by reference herein in their entireties.

TECHNICAL FIELD

The present invention relates to a blocked polyisocyanate composition, a prepolymer composition that is a mixture of a blocked polyisocyanate compound and a polyisocyanate-reactive compound, and a method for manufacturing them, as well as to a thermally dissociative the blocking agent of the blocked polyisocyanate composition. In particular, the present invention relates to a blocked polyisocyanate composition of a low-temperature dissociation type, a prepolymer composition of a low temperature thermosetting type that contains the blocked polyisocyanate composition, and a method for manufacturing them, as well as to a thermally dissociative blocking agent of a low-temperature dissociation type that is used for the blocked polyisocyanate composition.

BACKGROUND ART

Conventionally, for heat insulating materials, plywoods, wooden boards, electrical appliances or automobile interior parts, all of which require a strength, a phenolic resin and a prepolymer of a phenol resin have been widely used. However, the phenolic resin includes a formaldehyde in the raw material. Therefore, a product using the phenol resin presents a problem that the product generates a sick building syndrome or the like caused by divergence of the formaldehyde diffused from the product.

Therefore, in recent years, as a replacement for the phenol resin, there has been being used a thermosetting plastic made by thermally curing a prepolymer that is a mixture of a polyisocyanate compound and a polyisocyanate-reactive compound (hereinafter, for convenience of description, may be referred to as "isocyanate prepolymer".) for paper products, wooden products, electrical appliances, automotive interior parts, and the like. In the present application documents, the term "poly-isocyanate-reactive compound" is used in the sense of a compound having a high reactivity with the polyisocyanate compound (typically a polyol of a saccharide or the like). However, the term "isocyanate-reactive compound" is used in the sense corresponding to the term "active hydrogen compound".

The isocyanate prepolymer as an uncured product of the thermosetting plastic is adsorbed or impregnated or the like onto a paper, a wood, a glass, a plastic, a metal, or the like, by a method of coating, dipping or spraying. Then, it is heated to a predetermined temperature and is further pressurized to a predetermined pressure. Thereby, adhesion, curing and molding proceed therein, so that a thermosetting plastic and its molded product are formed.

Moreover, the isocyanate prepolymer is added with a variety of catalyst to adjust a reaction rate. Furthermore, a foaming agent, a filler material or a polyol other than a biological system is added to give light weight, heat insulation, rigidity or flexibility.

PRIOR ART LITERATURE

Patent Literature

Patent Document 1: JP-A-2008-179736 Publication; Patent Document 2: JP-A-S50-46994 Publication; Patent Document 3: JP-A-S56-151753 Publication; Patent Document 4: Japanese Patent No. 3002768 Publication; Patent Document 5: Japanese Patent No. 3199150 Publication; Patent Document 6: JP-B-H$_2$-14948 Publication On the other hand, a terminal isocyanate group of the polyisocyanate compound as a raw material for the isocyanate prepolymer has a high reactivity to easily react with the active hydroxyl group. Accordingly, the isocyanate prepolymer has a characteristic that a self-curing progresses even at a room temperature. Therefore, it is an issue for the isocyanate prepolymer how to secure a pot life (lifetime) from the viewpoint of practical use.

Here, Patent Document 1 relates to a heat curing process of a thermosetting plastic composition mixing a sugar and a polyisocyanate as a polyisocyanate-reactive compound (equivalent to the isocyanate prepolymer). It discloses suppressing progress of self-curing at a room temperature of the isocyanate prepolymer by using an inactive or low-active sugar as the sugar. In detail, according to the disclosure of Patent Document 1, when the inactive or low-active sugar (monosaccharide, disaccharide, oligosaccharide) is in a crystalline state (crystalline powder state), the hydroxyl group is less active and has poor reactivity. Therefore, it is possible to store and keep such sugar in a mixed state with the polyisocyanate compound. Moreover, in this heat curing process, the sugar in the crystalline state is melted by heating. Consequently, the hydroxyl group of the sugar is activated to react rapidly with the terminal isocyanate group of the polyisocyanate compound, including an effect of a catalyst. Still, even during the sugar is maintained in the crystalline state, activity of the hydroxyl group is slightly observed at a surface of the sugar. Thus, the self-curing of the isocyanate prepolymer progresses, so that the pot life (lifetime) of the isocyanate prepolymer is considered to be only about 1 week.

In order to suppress the self-curing of the isocyanate prepolymer, it is possible to restrain the reactivity of the isocyanate group by blocking the isocyanate group of the polyisocyanate compound with a blocking agent used to block a terminal isocyanate group of a prepolymer of an urethane resin, such as a phenol, an ε-caprolactam, or a 2-butanone oxime. However, these blocking agents have a high thermal dissociation temperature. Therefore, they requires a heating condition of 3 minutes or more at 180 degrees centigrade in order to make the isocyanate prepolymer reach a practical cure degree. In contrast, a prepolymer of the phenol resin provides a practical cure degree in a heating condition of less than 3 minutes at 160 degrees centigrade. Thus, in terms of performing practical curing with a heating condition at a lower temperature, the prepolymer of the phenolic resin is superior to the isocyanate prepolymer.

In addition, Patent Document 2, Patent Document 3, Patent Document 4 and Patent Document 5 show examples that use a blocking agent such as a hydrogen sulfite salt or a disulfurous acid salt that thermally dissociates at 60 degrees centigrade or more, in order to give a prepolymer of an urethane resin a low-temperature curing property. However, the blocking agent such as the hydrogen sulfite salt generates a toxic sulfur dioxide gas during the thermally dissociative blocking agent. Thus, there is a fear that it has a significant impact on the environment. In Patent Document 6, a blocking agent of a polyamine compound or a thiol compound is shown. However, according to this example, unpleasant odor is generated at the time of manufacturing or at the time of dissociating of the blocking agent. Moreover, it is expensive as compared with the conventional blocking agent. Therefore, it has little practical use.

SUMMARY OF THE INVENTION

In view of the above, an object of the present invention is to provide a blocked polyisocyanate composition, a prepolymer composition and a method for manufacturing them each of which is able to impart a low temperature thermosetting property surpassing the prepolymer of the phenolic resin to a prepolymer as a mixture of a blocked polyisocyanate compound and a polyisocyanate reactive compound, while suppressing generation of a toxic gas impacting on the environment and an unpleasant odor at the time of manufacturing or at the time of thermal curing, and each of which is capable of providing a thermosetting plastic as a thermally cured product thereof to the market at a cost comparable to the phenolic resin, while restraining divergence of the formaldehyde, and to provide a thermally dissociative blocking agent of low temperature dissociation type having a particularly suitable use as a blocking agent of the above blocked polyisocyanate composition.

A blocked polyisocyanate composition according to claim 1 is characterized in that a blocked polyisocyanate composition that is synthesized from a polyisocyanate compound and a thermally dissociative blocking agent, wherein the thermally dissociative blocking agent is at least one kind of thermally dissociative blocking agent selected from a group consisting of a carbonate of an alkali metal, a hydrogen carbonate of an alkali metal, a percarbonate of an alkali metal, a phosphate of an alkali metal, a hydrogen phosphate salt of an alkali metal, a dihydrogen phosphate salt of an alkali metal, a carbonate of an ammonium, a hydrogen carbonate of an ammonium, a percarbonate of an ammonium, a phosphate of an ammonium, a hydrogen phosphate salt of an ammonium, and a dihydrogen phosphate salt of an ammonium.

A blocked polyisocyanate composition according to claim 2 is characterized in that, in the configuration of claim 1, the thermally dissociative blocking agent is at least one kind of thermally dissociative blocking agent or a mixture of a group of two or more kinds of thermally dissociative blocking agents selected from a group consisting of a sodium carbonate, a potassium carbonate, an ammonium carbonate, a sodium hydrogen carbonate, a potassium hydrogen carbonate, an ammonium hydrogen carbonate, a sodium percarbonate, a potassium percarbonate, an ammonium percarbonate, a sodium phosphate, a potassium phosphate, an ammonium phosphate, a sodium hydrogen phosphate, a potassium hydrogen phosphate, an ammonium hydrogen phosphate, a sodium dihydrogen phosphate, a potassium dihydrogen phosphate, and an ammonium dihydrogen phosphate.

A blocked polyisocyanate composition according to claim 3 is characterized in that, in the configuration of claim 1 or 2, an addition amount of the thermally dissociative blocking agent is 0.1 to 2.0 mol to 1 mol of the polyisocyanate compound in terms of an NCO group content.

A blocked polyisocyanate composition according to claim 4 is characterized in that, in the construction of one of claims 1 to 3, a dissociation temperature of the thermally dissociative blocking agent is in a range of 80 to 150 degrees centigrade.

A method for manufacturing a blocked polyisocyanate composition according to claim 5 is a method for manufacturing the blocked polyisocyanate composition as recited in one of claims 1 to 4 in an aqueous mixed solvent combining water with a polar organic solvent and is characterized in that an addition amount of the polar organic solvent is in a range of 1 to 500 parts to 100 parts of the water in the aqueous mixed solvent.

A method for manufacturing a blocked polyisocyanate composition according to claim 6 is characterized in that, in the configuration of claim 5, a temperature of the aqueous mixed solvent is in a temperature range of 0 to 80 degrees centigrade.

A prepolymer composition according to claim 7 is characterized in that it is a prepolymer composition as a mixture of the blocked polyisocyanate composition according to one of claims 1 to 4 and a polyisocyanate-reactive compound reacting with the blocked isocyanate composition and that it is thermally cured by heating.

A prepolymer composition according to claim 8 characterized in that, in the configuration of claim 7, a curing temperature when thermally cured by heating is in a temperature range of 80 to 150 degrees centigrade.

A prepolymer composition according to claim 9 characterized in that, in the configuration of claim 7 or 8, a curing time when thermally cured by heating is in a time range of 20 to 180 seconds.

A thermally dissociative blocking agent for a blocked polyisocyanate composition according to claim 10 is a thermally dissociative blocking agent for a blocked polyisocyanate composition for protecting an isocyanate group of a polyisocyanate compound and is characterized in that it is composed of at least one kind of thermally dissociative blocking agent selected from a group consisting of a carbonate of an alkali metal, a hydrogen carbonate of an alkali metal, a percarbonate of an alkali metal, a phosphate of an alkali metal, a hydrogen phosphate salt of an alkali metal, a dihydrogen phosphate salt of an alkali metal, a carbonate of an ammonium, a hydrogen carbonate of an ammonium, a percarbonate of an ammonium, a phosphate of an ammonium, a hydrogen phosphate salt of an ammonium, and a dihydrogen phosphate salt of an ammonium.

BRIEF DESCRIPTION OF THE DRAWINGS

FIG. 2 is a copy of Table 1; and

FIG. 3 is a copy of Table 2.

DESCRIPTION OF THE PREFERRED EMBODIMENTS

Figure 1:
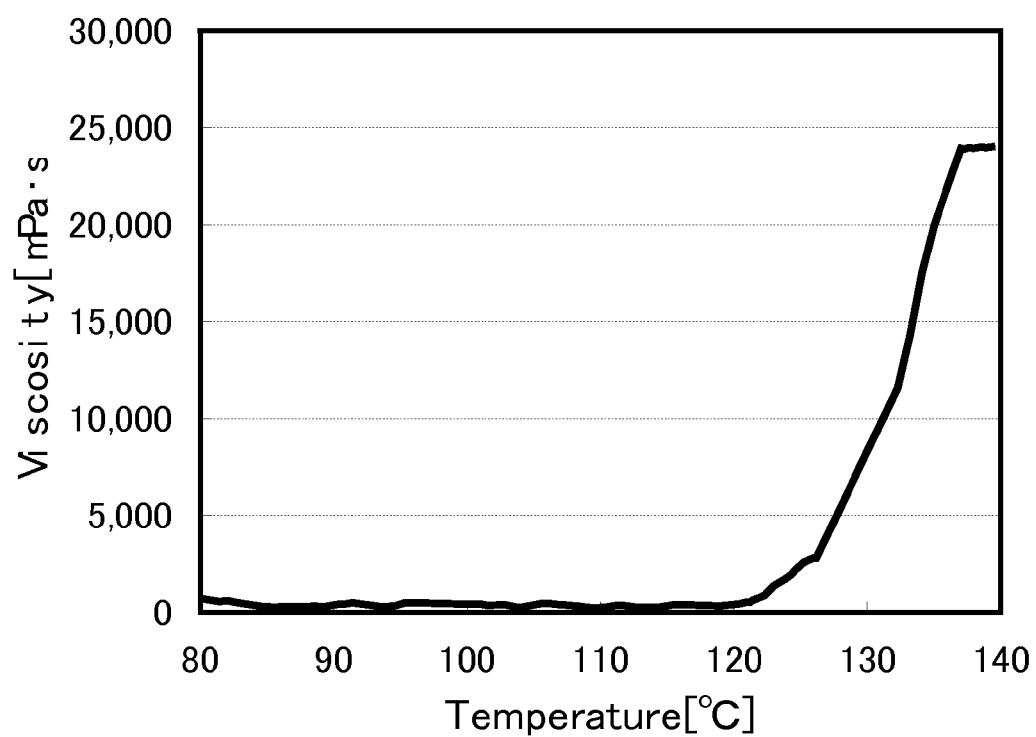
FIG. 1 is a graph showing a temperature rise/curing characteristic of a prepolymer according to Working Example 1 of the present invention.

According to the present invention, it is possible to provide a blocked polyisocyanate composition, a prepolymer composition and a method for manufacturing them each of which is able to impart a low temperature thermosetting property surpassing the prepolymer of the phenolic resin to a prepolymer as a mixture of a blocked polyisocyanate compound and a polyisocyanate reactive compound, while suppressing generation of a toxic gas impacting on the environment and an unpleasant odor at the time of manufacturing or at the time of thermal curing, and each of which is capable of providing a thermosetting plastic as a thermally cured product thereof to the market at a cost comparable to the phenolic resin, while restraining divergence of the formaldehyde, and to provide a thermally dissociative blocking agent of low temperature dissociation type having a particularly suitable use as a blocking agent of the above blocked polyisocyanate composition.

In particular, according to the present invention, the carbonate, the hydrogen carbonate, the percarbonate, the phosphate, the hydrogen phosphate salt and the dihydrogen phosphate salt, which are used as the thermally dissociative blocking agent for the polyisocyanate compound, are very inexpensive in comparison with a thermally dissociative blocking agent to be used as a blocking agent for a prepolymer of an urethane resin. The prepolymer consisting of the blocked isocyanate and the polyol is inexpensive even in comparison with the phenolic resin or the prepolymer of the phenolic resin.

Moreover, according to the present invention, in the production of the thermosetting plastic, an existing manufacturing process for the phenolic resin can be used as it is (i.e. various steps of a raw material mixing step for mixing a polyol or an amine as a main material, a blocked polyisocyanate compound as a curing agent, and, if necessary, another material such as a catalyst; a mold filling step for filling the mixed material into a mold, a heating/curing step for thermally curing the mixed material filled in the mold, a cooling step for cooling the cured material, and the like). Consequently, it is possible to achieve dissemination thereof as an alternative to the phenolic resin. Moreover, in the blocked polyisocyanate composition and the prepolymer composition of the present invention, the thermal curing progresses in a very low temperature range (100 to 150 degrees centigrade). Thus, it can be expected that an energy is significantly reduced at the time of manufacturing the thermosetting plastic and that costs are largely cut due to reduction in time.

Furthermore, according to the present invention, the gas generated at the time of manufacturing or at the time of thermal curing of the prepolymer composition is limited almost to a carbon dioxide (or a phosphoric acid gas), except a water vapor. Thus, there is not observed generation of a toxic gas and an offensive odor due to dissociation of the thermally dissociative blocking agent, as in the case of using the other thermally dissociative blocking agents. Also, there is no generation of an ammonia and a formaldehyde produced by decomposition of a hexamethylenetetramine as a curing catalyst for the prepolymer of the phenolic resin.

In addition, according to the present invention, whereas the other metal salts (oxides or hydroxides) cause precipitation or the like since they are not hydrophilic to the water, the salt of the alkali metal (and ammonium) constituting the thermally dissociative blocking agent is hydrophilic to the water. Thus, it is possible to ensure a smooth work in the preparation of the blocked polyisocyanate composition with the aqueous solvent.

Several modes for practicing the present invention (hereinafter referred to as "embodiments") will be described hereinafter. Before describing the embodiments of the present invention, a thermally dissociative blocking agent and a blocked polyisocyanate composition using the thermally dissociative blocking agent of the present invention are described (as a description of a broader concept including each of the embodiments). First, the present inventors have conducted an extensive study seeking a thermally dissociative blocking agent that thermally dissociates, while generating no gas affecting the environment and no offensive odor. As a result, the inventors obtained a knowledge of a blocking agent, as a thermally dissociative blocking agent for the polyisocyanate compound, that has a thermally dissociative property at a low temperature equivalent to that of a conventional blocking agent such as a bisulfite or a disulfite and that generates no toxic gas such as a sulfurous acid gas at the time of manufacturing or at the time of thermal dissociation. Thereby, the inventors have conceived the thermally dissociative blocking agent of the present invention, and then, have conceived the invention of the polyisocyanate composition using the thermally dissociative blocking agent and the prepolymer using the polyisocyanate composition. That is, the present invention provides, as a first aspect of the invention, a blocked polyisocyanate composition that is composed of a polyisocyanate compound and a thermally dissociative blocking agent capable of dissociating at a very low temperature by reacting with the polyisocyanate compound and that synthesizes a blocked polyisocyanate compound by the thermally dissociative blocking agent protecting terminal isocyanate groups of the polyisocyanate compound. The present invention provides, as a second aspect of the invention, a blocked polyisocyanate prepolymer as a mixture of the blocked polyisocyanate compound and a polyisocyanate-reactive compound. The present invention provides, as a third aspect of the invention, a method for manufacturing the blocked polyisocyanate compound in an aqueous solvent. The present invention provides, as a fourth aspect of the invention, a method for manufacturing the blocked polyisocyanate prepolymer in an aqueous solvent. The present invention provides, as a fifth aspect of the invention, a thermally dissociative blocking agent applied as a thermally dissociative blocking agent for the blocked polyisocyanate composition.

<Thermally dissociative blocking agent> Here, the blocked polyisocyanate composition of the present invention is the one that synthesizes the blocked polyisocyanate compound from the polyisocyanate compound and the thermally dissociative blocking agent capable of dissociating at a very low temperature, and is characterized in that the thermally dissociative blocking agent is one kind or two or more kinds of a carbonate, a hydrogen carbonate, a percarbonate, a phosphate, a hydrogen phosphate salt and a dihydrogen phosphate salt. That is, the thermally dissociative blocking agent of the blocked polyisocyanate composition according to the present invention is characterized by being at least one kind of thermally dissociative blocking agent selected from a group consisting of a carbonate of an alkali metal, a hydrogen carbonate of an alkali metal, a percarbonate of an alkali metal, a phosphate of an alkali metal, a hydrogen phosphate salt of an alkali metal, a dihydrogen phosphate salt of an alkali metal, a carbonate of an ammonium, a hydrogen carbonate of an ammonium, a percarbonate of an ammonium, a phosphate of an ammonium, a hydrogen phosphate salt of an ammonium, and a dihydrogen phosphate salt of an ammonium.

In other words, the thermally dissociative blocking agent of the present invention may be sorted (or classified in terms of large category) into: a first kind of thermally dissociative blocking agent (of the large category) composed of one kind or two or more kinds of the carbonate, the hydrogen carbonate or the percarbonate of the alkali metal or the ammonium (in the documents of the present application, for convenience of description, may be referred to as "carbonate-based thermally dissociative blocking agent".); and a second kind of thermally dissociative blocking agent (of the large category) composed of one kind or two or more kinds of the phosphate, the hydrogen phosphate salt or the dihydrogen phosphate salt of the alkali metal or the ammonium (in the documents of the present application, for convenience of description, may be referred to as "phosphate-based thermally dissociative blocking agent".) In this case, the thermally dissociative blocking agent of the present invention may be constituted from a thermally dissociative blocking agent that mixes (or is a mixed type of) two or more kinds of the first and the second kinds of the thermally dissociative blocking agents (of the large category).

Alternatively, the thermally dissociative blocking agent of the present invention may be sorted (or classified in terms of medium category) into: a first kind of thermally dissociative blocking agent (of the medium category) composed of one kind or two or more kinds of the carbonate, the hydrogen carbonate or the percarbonate of the alkali metal (in the documents of the present application, for convenience of description, may be referred to as "alkali-metal-carbonate-based thermally dissociative blocking agent".); a second kind of thermally dissociative blocking agent (of the medium category) composed of one kind or two or more kinds of the carbonate, the hydrogen carbonate or the percarbonate of the ammonium (in the documents of the present application, for convenience of description, may be referred to as "ammonium-carbonate-based thermally dissociative blocking agent".); a third kind of thermally dissociative blocking agent (of the medium category) composed of one kind or two or more kinds of the phosphate, the hydrogen phosphate salt or the dihydrogen phosphate salt of the alkali metal (in the documents of the present application, for convenience of description, may be referred to as "alkali-metal-phosphate-based thermally dissociative blocking agent".); and a fourth kind of thermally dissociative blocking agent (of the medium category) composed of one kind or two or more kinds of the phosphate, the hydrogen phosphate salt or the dihydrogen phosphate salt of the ammonium (in the documents of the present application, for convenience of description, may be referred to as "ammonium-phosphate-based thermally dissociative blocking agent".). In this case, the thermally dissociative blocking agent of the present invention may be constituted from a thermally dissociative blocking agent that mixes (or is a mixed type of) two or more kinds (two kinds, three kinds or four kinds) of the first to the fourth kinds of the thermally dissociative blocking agents (of the medium category).

With respect to specific examples of the thermally dissociative blocking agent, as the above-mentioned carbonate-based thermally dissociative blocking agent, there are exemplified a sodium carbonate ($Na_2CO_3$), a potassium carbonate ($K_2CO_3$), an ammonium carbonate (($NH_4$)$_2$CO), a sodium hydrogen carbonate ($NaHCO_3$), a potassium hydrogen carbonate ($KHCO_3$), an ammonium hydrogen carbonate ($NH_4HCO_3$), a sodium percarbonate ($Na_2CO_3.1.5H_2O_2$), a potassium carbonate ($K_2CO_4$), an ammonium percarbonate (($NH_4$)$_2CO_4$) or a mixtures thereof. As the phosphate-based thermally dissociative blocking agent, there are exemplified a sodium phosphate ($Na_3PO_4$), a potassium phosphate ($K_3PO_4$), an ammonium phosphate (($NH_4$)$_3PO_4$), a sodium hydrogen phosphate ($Na_2HPO_4$), a potassium hydrogen phosphate ($K_2HPO_4$), an ammonium hydrogen phosphate (($NH_4$)$_2HPO_4$), a sodium dihydrogen phosphate ($NaH_2PO_4$), a potassium dihydrogen phosphate ($KH_2PO_4$), an ammonium dihydrogen phosphate ($NH_4H_2PO_4$) or a mixture thereof. Preferably, the sodium hydrogen carbonate is used as the thermally dissociative blocking agent, among the above-mentioned, from a viewpoint of a thermal dissociation at a very low temperature, a type of gas generated at the time of thermal dissociation, or the like.

<Addition amount of thermally dissociative blocking agent> The addition amount of the thermally dissociative blocking agent of the blocked polyisocyanate composition of the present invention is preferably 0.1 to 2.0 mol, more preferably 0.5 to 2.0 mol, and still more preferably 1.0 to 1.5 mol in terms of NCO content, in any kind of the above-mentioned thermally dissociative blocking agents.

<Dissociation temperature of blocked polyisocyanate compound> The dissociation temperature of the blocked polyisocyanate compound (at which the thermally dissociative blocking agent dissociates by heating from the isocyanate group of the polyisocyanate compound) is almost the same, regardless of whether the thermally dissociative blocking agent is the carbonate-based or the phosphate-based. It is in a temperature range of 80 to 150 degrees centigrade. That is, it is confirmed in the experimental results by the present inventors that there is no significant difference (that is, is substantially equal) in the dissociation temperature of the blocked polyisocyanate compound, regardless of whether the thermally dissociative blocking agent is the carbonate-based thermally dissociative blocking agent or the phosphate-based thermally dissociative blocking agent, as long as it is judged in terms of a broader concept as the carbonate-based thermally dissociative blocking agent and the phosphate-based thermally dissociative blocking agent. Even if there is a slight difference in the dissociation temperature depending on the type of the thermally dissociative blocking agent, it can be grasped as nearly equal in terms of the characteristics. On the other hand, depending on an individual or specific kind of the carbonate-based thermally dissociative blocking agent and the phosphate-based thermally dissociative blocking agent (i.e. depending on an individual or specific kind of the above-listed thermally dissociative blocking agents such as the sodium carbonate and the ammonium carbonate), as a matter of course, there are cases in which the dissociation temperature is different within the temperature range above 80 to degrees centigrade to 150 degrees centigrade, in accordance with the kinds of the polyisocyanate compounds to be combined, the blended rate of the thermally dissociative blocking agent to the polyisocyanate compound, the manufacturing conditions, etc.

<Curing temperature of blocked polyisocyanate prepolymer composition> A curing temperature of the blocked polyisocyanate prepolymer composition of the present invention is nearly equal regardless whether the thermally dissociative blocking agent is the carbonate-based or the phosphate-based (in the same sense as the case that described the above-mentioned blocked polyisocyanate composition). It is in the temperature range of 80 to 150 degrees centigrade. That is, as described above, regardless whether the thermally dissociative blocking agent contained in the blocked polyisocyanate composition is carbonate-based or the phosphate-based, the dissociation temperature of the blocked polyisocyanate composition is substantially equal. Thus, the curing temperature of the blocked polyisocyanate prepolymer composition is also substantially equivalent.

<Curing time of blocked polyisocyanate prepolymer composition> A curing time of the blocked polyisocyanate prepolymer composition of the present invention is in a time range of 20 to 180 seconds.

[Confirmation by experimental results] The inventors of the present invention conducted intensive experiments in the course of completing the blocked polyisocyanate composition and the blocked polyisocyanate prepolymer composition of the present invention. From results of the experiments, it is confirmed that the alkali metal carbonate or the like acts as the thermally dissociative blocking agent of the present invention so as to surely perform predetermined functions and effects (blocking and/or protecting effect of the terminal and/or free NCO groups of the blocked polyisocyanate compound and dissociative effect of the blocking agent at a predetermined low temperature range in the heating). The experimental results are described hereafter.

<Blocking of NCO group in blocked polyisocyanate composition> First, the present inventors maintained an aqueous solvent, which contains a dioxane with a sodium hydrogen carbonate dissolved therein, at a constant temperature in a predetermined container. It was stirred for a long time, while a diphenylmethane diisocyanate (MDI) was dripped therein. Then, a viscous solution was obtained at a bottom of the container. The solution was analyzed by FT-IR (FT-IR6000 manufactured by JASCO Corporation). Then, an infrared absorption spectrum in the vicinity of 2240 $cm^{-1}$ due to the NCO group (isocyanate group) of the MDI had disappeared. Moreover, significant infrared absorption spectra of $HCO_3$ group (hydrogen carbonate group) had appeared in the vicinity of 1370 $cm^{-1}$ and in the vicinity of 830 $cm^{-1}$. Generally, a $CO_3$ group (carbonate group) shows an infrared absorption around 1430 $cm^{-1}$ and around 870 $cm^{-1}$. However, it is expected that significant absorption spectra appear near 1370 $cm^{-1}$ and near 830 $cm^{-1}$ (by the absorption spectra of the $CO_3$ group shifting down) in bicarbonates such as a sodium hydrogen carbonate or a potassium hydrogen carbonate (having a bicarbonate group). Moreover, these bicarbonates have a characteristic absorption spectrum in the vicinity of 975 $cm^{-1}$ to 1000 $cm^{-1}$ in addition. However, the solution obtained at this time did not show the absorption spectrum at that band. Thus, it was confirmed that no residues of the bicarbonate remained in the solution. From these facts, the followings were confirmed. First, the solution is a viscous solution as described above, and it shows the infrared absorption spectrum as shown described above. Thus, it was confirmed that it was a solution to which the bicarbonate was involved. Moreover, this solution does not show the absorption spectrum around 975 $cm^{-1}$ to 1000 $cm^{-1}$. Thus, it was confirmed that it was not a solution in which the sodium hydrogen carbonate was simply mixed (i.e. not simply mixed, but added to the NCO group of the polyisocyanate compound as a bicarbonate group thereinstead). Furthermore, this solution does not show the absorption spectrum that is unique in the NCO group, while it shows the absorption spectrum that is intrinsic to the $HCO_3$ group. Thus, it was confirmed that it was a blocked polyisocyanate compound in which the NCO group of the MDI is blocked by the bicarbonate group rather than by the carbonate group. This means that, when the polyisocyanate compound such as the MDI is present in an aqueous solvent that is maintained at a constant temperature, it is the bicarbonate group rather than the water that reacts faster with the isocyanate group of the polyisocyanate compound.

<The thermal dissociation of a blocked polyisocyanate prepolymer composition> Then, the present inventors prepared a viscous solution with a glucose dissolved therein and measured a viscosity thereof by use of a rheometer (digital cone viscometer CV-1S made by M.S.T. Engineering Co., Ltd.). As a result, curing progressed rapidly in a temperature range of 120 to 130 degrees centigrade, and it reached an unmeasurable cure degree (intrinsic viscosity). During this thermal curing process, there was no generation of a toxic gas or an unpleasant odor. Thus, it was shown that the blocking agent of the bicarbonate had a low temperature dissociative property comparable to the sodium hydrogen sulfite and that the use of the glucose enabled a thermal curing rate surpassing a prepolymer of the phenolic resin.

The inventors conducted experiments using the carbonate, the percarbonate, the phosphate, the hydrogen phosphate salt, and the dihydrogen phosphate salt, in addition to the hydrogen carbonate. Consequently, a thermal dissociation phenomenon was confirmed on them at the same temperature as the hydrogen carbonate, too. Moreover, it was confirmed that the curing temperature varied in the temperature range of 80 to 150 degrees centigrade in the prepolymer composition of the present invention, depending on the kind of the polyisocyanate-reactive compound to be mixed with the blocked polyisocyanate composition.

[Description of Embodiments] Next, the embodiment of the present invention will be explained. In the following descriptions of the embodiments on the blocked polyisocyanate compositions and the thermally dissociative blocking agents in the prepolymer compositions of the present invention, the thermally dissociative blocking agents are classified into four types as described above, that is, the alkali metal carbonate-based thermally dissociative blocking agent, the alkali metal phosphate-based thermally dissociative blocking agent, the ammonium carbonate-based thermally dissociative blocking agent, and the ammonium phosphate type thermally dissociative blocking agent. Then, the inventions of the blocked polyisocyanate compositions and the prepolymer compositions containing those thermally dissociative blocking agents will be described as an Embodiment 1, an Embodiment 2, an Embodiment 3, and an Embodiment 4, respectively.

[Embodiment 1] <Blocked polyisocyanate composition> A blocked polyisocyanate composition according to the Embodiment 1 is composed of a polyisocyanate compound and an alkali metal carbonate-based thermally dissociative blocking agent that reacts with the polyisocyanate compound so as to be dissociated in a very low temperature. A blocked polyisocyanate compound is synthesized by protecting terminal isocyanate groups of the polyisocyanate compound with the alkali metal carbonate-based thermally dissociative blocking agent.

<Polyisocyanate compound> In the present embodiment, as the polyisocyanate compound, there may be used: one kind of a diphenylmethane diisocyanate (MDI), a polymethylene polyphenyl polyisocyanate (polymeric MDI), a tolylene diisocyanate (TDI), a hexamethylene diisocyanate (HDC), an isophorone diisocyanate (IPDI), a naphthalene diisocyanate (NDI), a mixture of these polyisocyanates with one another; a modified isocyanate made by modifying these polyisocyanates with an urethane modification, an allophanate modification, a carbodiimide (CD) modification, an isocyanurate modification, or the like, and a mixture thereof. Preferably, the polyisocyanate compound is the MDI.

<Thermally dissociative blocking agent> In the present embodiment, the alkali metal carbonate-based thermally dissociative blocking agent is used as the thermally dissociative blocking agent. Specifically, the thermally dissociative blocking agent is any one kind or a mixture of two or more kinds of the carbonate of the alkali metal, the hydrogen carbonate of the alkali metal, and the percarbonate of the alkali metal. More in detail, the present embodiment of the thermally dissociative blocking agent is any one kind or a mixture of two or more kinds of: a sodium carbonate ($Na_2CO_3$), a potassium carbonate ($K_2CO_3$), a sodium hydrogen carbonate ($NaHCO_3$), a potassium hydrogen carbonate ($KHCO_3$), a sodium percarbonate ($Na_2CO_3.1.5H_2O_2$), and a potassium carbonate ($K_2CO_4$).

<General formula of blocked polyisocyanate composition (compound)> A general formula of the blocked polyisocyanate composition of the present embodiment (and the blocked polyisocyanate compound synthesized with the blocked polyisocyanate composition) is a molecular formula shown in a formula (1), in case of using the sodium hydrogen carbonate as the thermally dissociative blocking agent. In the formula, —R—HNCO— indicates a polyisocyanate compound. In addition, the formula (1) shows the case where the thermally dissociative blocking agent of the present invention reacts and protects the terminal (free) isocyanate group (NCO group) of each isocyanate monomer.

(Sodium hydrogen carbonate: $NaHCO_3$)

$$—R—NHCO—CO_3^-.Na^+ \quad \text{General formula (1)}$$

Thus, as shown in the formula (1), if the thermally dissociative blocking agent is the sodium hydrogen carbonate, the carbonate group protects (blocks) the terminal isocyanate group (NCO group) of the polyisocyanate compound.

Moreover, the general formulae of the blocked polyisocyanate composition (and the compound) of the present embodiment are molecular formulae represented by the following formulae (2) to (6), respectively, in case one of the sodium carbonate, the potassium carbonate, the potassium hydrogen carbonate, the sodium percarbonate or the potassium per carbonate is used as the thermally dissociative blocking agent in place of the sodium hydrogen carbonate. In these cases, as shown in the formulae (2) to (6), the carbonate group of each thermally dissociative blocking agent protects (blocks) the terminal isocyanate group (NCO group) of the polyisocyanate compound.

(Sodium carbonate: $Na_2CO_3$)

$$—R—NHCO—CO3^-.Na^++Na^+ \quad \text{General formula (2)}$$

(Potassium carbonate: $K_2CO_3$)

$$—R—NHCO—CO_3^-.K^++K^+ \quad \text{General formula (3)}$$

(Potassium bicarbonate: $KHCO_3$)

$$—R—NHCO—CO_3^-.K^+ \quad \text{General formula (4)}$$

(Sodium percarbonate: $Na_2CO_3.1.5H_2O_2$)

$$—R—NHCO—CO_3^-.Na^++Na^++1.5H_2O_2+0.75O_2 \quad \text{General formula (5)}$$

(Potassium percarbonate: $0.5(K_2C_2O_6)$)

$$—R—NHCO—CO_3^-.K^+ \quad \text{General formula (6)}$$

<Addition amount of thermally dissociative blocking agent> The addition amount of the thermally dissociative blocking agent in the blocked polyisocyanate composition (and compound) of the present embodiment is 0.1 to 2.0 mol, preferably 0.5 to 2.0 mol, most preferably 1.0 to 1.5 mol to 1 mol of the polyisocyanate in terms of NCO group content, in either of the above-described types of thermally dissociative blocking agents.

<Dissociation temperature of blocked polyisocyanate> The blocked polyisocyanate compound of the present embodiment uses the alkali metal carbonate-based thermally dissociative blocking agent as the thermally dissociative blocking agent. Thus, as described above, the thermal dissociation temperature is in the temperature range of 80 to 150 degrees centigrade (i.e. the lower limit is about 80 degrees centigrade and the upper limit is about 150 degrees centigrade).

<Method of manufacturing blocked polyisocyanate composition> In a method for manufacturing the blocked polyisocyanate composition of the present embodiment, first, in a thermally dissociative blocking agent preparation step, a predetermined amount of a thermally dissociative blocking agent (such as the sodium hydrogen carbonate) is dissolved in an aqueous solvent containing (added with) a predetermined amount of a polar organic solvent (such as a dioxane) so as to be a given concentration in a predetermined container, thereby preparing a thermally dissociative blocking agent solution. Then, the thermally dissociative blocking agent solution is maintained at a constant temperature by a predetermined cooling devise, while being stirred by a predetermined stirrer at a constant stirring rate. Next, in a blocked polyisocyanate composition preparation step, the thermally dissociative blocking agent solution is stirred by a predetermined stirrer, while a predetermined amount of an isocyanate compound such as the diphenylmethane diisocyanate (MDI) is dripped into the thermally dissociative blocking agent solution that is maintained at the constant temperature in the container, for a predetermined long time (e.g. in a time range of 30 minutes to 90 minutes, preferably, about 1 hour). Thus, a viscous blocked polyisocyanate solution is obtained. Moreover, this blocked polyisocyanate solution is dried for a predetermined time at a predetermined drying temperature by a given drying apparatus and/or a predetermined drying method (such as a vacuum drying). Thus, a solid blocked polyisocyanate composition is obtained. Here, the blocked isocyanate composition of the present embodiment may be embodied into this solid blocked polyisocyanate composition, but may also be embodied as the aforementioned blocked polyisocyanate solution.

<Polar organic solvent> As the polar organic solvent, there are listed: a ketone solvent such as a methyl ethyl ketone (MEK), an acetone, a diethyl ketone, a methyl isobutyl ketone (MIBK), a methyl isopropyl ketone (MIPK), or a cyclohexanone; an alcohol solvent such as a methanol, an ethanol, an isopropanol, an ethylene glycol, a diethylene glycol (DEG), a glycerin; an ether solvent such as a diethyl ether, a diisopropyl ether, a 1,2-dimethoxyethane (DME), a dioxane, a tetrahydrofuran (THF), a tetrahydropyran (THP), an anisole, a diethylene glycol dimethyl ether (diglyme), or a diethylene glycol ethyl ether (carbitol); an aliphatic hydrocarbon solvent such as a hexane, a pentane, a heptane, or a cyclohexane; an aromatic hydrocarbon solvent such as a toluene, a xylene, or a benzene; an aromatic heterocyclic compound-based solvent such as a pyridine, a pyrazine, a furan, a pyrrole, a thiophene, or a methyl pyrrolidone; an amide solvent such as a N,N-dimethylformamide (DMF), or a N,N-dimethylacetamide (DMA); a halogen compound-based solvent such as a chlorobenzene, a dichloromethane, a chloroform, or a 1,2-dichloroethane; an ester solvent such as an ethyl acetate, a methyl acetate, or an ethyl formate; a sulfur compound-based solvent such as a dimethyl sulfoxide (DMSO), or a sulfolane; a nitrile solvent such as an acetonitrile, a propionitrile, or an acrylonitrile; various organic solvents like an organic acid-based solvent such as a formic acid, an acetic acid, a trichloroacetic acid, or a trifluoroacetic acid; or a mixed solvent containing them, and the like. Preferably, the polar organic solvent is the acetone or the dioxane. However, the usable polar organic solvent is not limited thereto.

<Addition amount of polar organic solvent> In the aqueous solvent used in the manufacturing method of the blocked polyisocyanate composition, the addition amount of the polar organic solvent is 1 to 500 parts, preferably 5 to 100 parts, most preferably 10 to 50 parts to 100 parts of the water.

<Temperature of aqueous solvent> In the manufacturing method of the blocked polyisocyanate composition, the temperature of the aqueous solvent (i.e. the temperature of the thermally dissociative blocking agent solution that is maintained at the constant temperature in the container) is in a temperature range of 0 to 80 degrees centigrade (i.e. it is necessary for the upper limit thereof to be 80 degrees centigrade at most, which is the lower limit of the dissociation temperature of the thermally dissociative blocking agent), preferably in a temperature range of 5 to 60 degrees centigrade, and most preferably in a temperature range of 5 to 20 degrees centigrade.

<Additives> The blocked polyisocyanate composition of the present embodiment may be further added with additives such as a catalyst as an optional component, if necessary.

<Blocked polyisocyanate prepolymer composition> The blocked isocyanate prepolymer composition of the present embodiment is a mixture of a blocked polyisocyanate compound synthesized from the blocked polyisocyanate composition and a polyisocyanate-reactive compound, and is characterized by being thermally cured by heating at a predetermined temperature.

<Polyisocyanate-reactive compound> The polyisocyanate reactive compound is a monosaccharide, a disaccharide, a small-number-saccharide, an oligosaccharide, a polysaccharide, a water-based polysaccharide, a polyhydric alcohol, an aromatic polyol, a primary amine compound, a secondary amine compound, a carboxylic acid compound, a water, or a mixture thereof. As the monosaccharide, there are a glucose, a fructose, a galactose, a mannose, a ribose, and the like. As the disaccharide, there are a maltose, a sucrose, a trehalose, a lactose, a cellobiose, an ylmaltose, a gentiobiose and the like. As the small-number saccharide, there are: a gentianose, a raffinose, a panose, and a melezitose (as trisaccharide); a stachyose (as tetrasaccharide); and the like. As the oligosaccharide, there are a fructo-oligosaccharide, n isomalto-oligosaccharide, a soybean oligosaccharide, and the like. As the polysaccharide, there are a starch, a cellulose, and the like. As the starch, there are a tapioca, a potato, a corn (maize), a wheat, a sweet potato, a rice, a sago, and the like. As the water-based polysaccharide, there are a dextrin, an alpha starch, and the like. Preferably, the polyisocyanate-reactive compound of the present embodiment consists of the glucose or the maltose.

<Manufacturing method of blocked polyisocyanate prepolymer composition> For the blocked isocyanate prepolymer composition of the present embodiment, first, in a raw material mixing step, a predetermined amount of the blocked polyisocyanate compound and a predetermined amount of the polyisocyanate-reactive compound are mixed are mixed in a predetermined container (so as to have a predetermined mixing ratio) to obtain a mixed raw material. Next, the mixed raw material is pulverized by a predetermined grinding device so as to have a predetermined particle size distribution (and a maximum particle size not more than a predetermined value), thereby obtaining the blocked isocyanate prepolymer composition of the present embodiment. Here, thus manufacture blocked isocyanate prepolymer composition of the present embodiment may be embodied as one of a resin type, an aqueous slurry type, and an aqueous dispersion type.

<Resin type of blocked isocyanate prepolymer composition> The resin type of blocked isocyanate prepolymer composition is made by dry-grinding a dried product of a mixture of the blocked polyisocyanate compound and the polyisocyanate-reactive compound in a predetermined dry milling apparatus so that the maximum particle size becomes 20 micrometers or less. As the dry milling apparatus, there may be used a hammer mill, a roller mill, a ball mill, a turbo-mill, and the like. The blocked isocyanate prepolymer composition of resin type is preferably prepared into a particle size range of 10 to 20 micrometers.

<Aqueous slurry type of blocked isocyanate prepolymer composition> The aqueous slurry type of blocked isocyanate prepolymer composition is made by wet-grinding a dried product of a mixture of the blocked polyisocyanate compound and the polyisocyanate-reactive compound in a predetermined wet milling apparatus so that the maximum particle size becomes 20 micrometers or less. As the wet milling apparatus, there may be used a homogenizer, a ball mill, and the like. The blocked isocyanate prepolymer composition of the aqueous slurry type may be added with a dispersing agent, a surface active agent, or the like, if desired. The blocked isocyanate prepolymer composition of aqueous slurry type is preferably prepared into a particle size range of 1 to 10 micrometers.

<Aqueous dispersion type of blocked isocyanate prepolymer composition> The aqueous dispersion type of blocked isocyanate prepolymer composition is made by grinding a dried product of a mixture of the blocked polyisocyanate compound and the polyisocyanate-reactive compound in a predetermined milling apparatus so that the maximum particle size becomes 10 micrometers or less. As the milling apparatus, there may be used a bead mill, a homogenizer, a ball mill, and the like. The aqueous dispersion type of blocked isocyanate prepolymer composition may be added with a dispersing agent, a surface active agent, or the like, if desired. The blocked isocyanate prepolymer composition of aqueous dispersion type is preferably prepared into a particle size range not more than 1 micrometer.

<Curing temperature of blocked isocyanate prepolymer composition> A curing temperature of the blocked isocyanate prepolymer composition of the present embodiment is commensurate with the dissociation temperature (depending on the thermally dissociative blocking agent to be used) of the blocked polyisocyanate compound contained therein (i.e. commensurate with the dissociation temperature of the alkali metal carbonate-based thermally dissociative blocking agent (carbonate-based) that is used as the thermally dissociative blocking agent in the present embodiment). It is in a temperature range of 80 to 150 degrees centigrade.

<Curing time of blocked isocyanate prepolymer composition> The blocked isocyanate prepolymer composition of the present embodiment contains the alkali metal carbonate-based thermally dissociative blocking agent (carbonate-based one) as the thermally dissociative blocking agent of the blocked polyisocyanate compound containing. A curing time thereof is in a time range of 20 to 180 seconds.

[Embodiment 2] <Blocked polyisocyanate composition> The blocked polyisocyanate composition according to the second embodiment is composed of a polyisocyanate compound and an alkali metal phosphate-based thermally dissociative blocking agent reacting with the polyisocyanate compound to be dissociated at a very low temperature. The blocked polyisocyanate composition synthesizes the blocked polyisocyanate compound by protecting the terminal isocyanate group of the polyisocyanate compound with the alkali metal phosphate-based thermally dissociative blocking agent.

<Polyisocyanate compound> In the present embodiment, as the polyisocyanate compound, the same ones as the first embodiment can be used.

<Thermally dissociative blocking agent> In this embodiment, as the thermally dissociative blocking agent, the aforementioned alkali metal phosphate-based thermally dissociative blocking agent is used. Specifically, the thermally dissociative blocking agent is any one kind or a mixture of two or more kinds of: a sodium phosphate ($Na_3PO_4$), a potassium phosphate ($K_3PO_4$), a sodium hydrogen phosphate ($Na_2HPO_4$), a potassium hydrogen phosphate ($K_2HPO_4$), a sodium dihydrogen phosphate ($NaH_2PO_4$), and a potassium dihydrogen phosphate ($KH_2PO_4$).

<General formula of blocked polyisocyanate composition (compound)> General formulae of the blocked polyisocyanate composition (compound) of the present embodiment are molecular formulae shown in the following formulae (7) to (12), respectively, for each of the kinds of the aforementioned alkali metal phosphate-based thermally dissociative blocking agents. (Only a case corresponding to the formula (1) is shown for each thermally dissociative blocking agent.) In these cases, as shown in the formulae (7) to (12), the phosphate group of each thermally dissociative blocking agent protects (blocks) the terminal isocyanate group (NCO group) of the polyisocyanate compound.

(Sodium phosphate: $Na_3PO_4$) (exemplary case of trisodium phosphate)

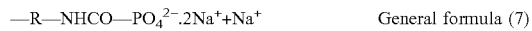
$$—R—NHCO—PO_4^{2-}.2Na^+ + Na^+ \qquad \text{General formula (7)}$$

(Potassium phosphate: $K_3PO_4$) (exemplary case of tripotassium phosphate)

$$—R—NHCO—PO_4^{2-}.2K^+ + K^+ \qquad \text{General formula (8)}$$

(Sodium hydrogen phosphate: $Na_2HPO_4$)

$$—R—NHCO—PO_4^{2-}.2Na^+ \qquad \text{General formula (9)}$$

(Potassium hydrogen phosphate: $K_2HPO_4$)

$$—R—NHCO—PO_4^{2-}.K^+ + K^+ \qquad \text{General formula (10)}$$

(Sodium dihydrogen phosphate: $NaH_2PO_4$)

$$—R—NHCO—PO_4^{2-}.Na^+ \qquad \text{General formula (11)}$$

(Potassium dihydrogen phosphate: $KH_2PO_4$)

$$—R—NHCO—PO_4^{2-}.K^+ + H^+ \qquad \text{General formula (12)}$$

<Addition amount of thermally dissociative blocking agent> The addition amount of the thermally dissociative blocking agent in the blocked polyisocyanate composition of the present embodiment (and compound) is the same as the blocked polyisocyanate composition of the first embodiment.

<Dissociation temperature of blocked polyisocyanate> The blocked polyisocyanate compound of the present embodiment uses the alkali metal phosphate-based thermally dissociative blocking agent (phosphate-based one) as the thermally dissociative blocked agent. The thermal dissociation temperature thereof is in the temperature range of 80 to 150 degrees centigrade as described above.

<Manufacturing method of blocked polyisocyanate composition> The method for manufacturing the blocked polyisocyanate composition of the present embodiment is the same as the manufacturing method of the blocked polyisocyanate composition of the first embodiment. The conditions such as the kind of the polar organic solvent to be used, the amount of the polar organic solvent, the temperature of the aqueous solvent, and the like are the same as the conditions of the blocked polyisocyanate composition of the first embodiment.

<Blocked isocyanate prepolymer composition> The blocked isocyanate prepolymer composition of the present embodiment is a mixture of the blocked polyisocyanate compound, which is synthesized from the blocked polyisocyanate composition, and the polyisocyanate-reactive compound, as in the first embodiment. The blocked isocyanate prepolymer composition is characterized in that it is thermally cured by heating at a predetermined temperature. Here, the polyisocyanate-reactive compounds can be similar to the polyisocyanate-reactive compound in the first embodiment.

<Manufacturing method of blocked polyisocyanate prepolymer composition> The method for manufacturing the blocked polyisocyanate prepolymer composition of the present embodiment is the same as the manufacturing method of the blocked polyisocyanate prepolymer composition of the first embodiment. As in the first embodiment, it can be embodied as one of the resin type, the aqueous slurry type, and the aqueous dispersion type.

<Curing temperature of blocked isocyanate prepolymer composition> The curing temperature of the blocked isocyanate prepolymer composition of the present embodiment is equal to the dissociation temperature (that depends on the thermally dissociative blocking agent to be used) of the blocked polyisocyanate compound contained therein (that is, it is equal to the dissociation temperature of the alkali metal phosphate-based thermally dissociative blocking agent (phosphate-based one) that is used as the thermally dissociative blocking agent in the present embodiment). It is in the temperature range of 80 to 150 degrees centigrade.

<Curing time of blocked isocyanate prepolymer composition> The blocked isocyanate prepolymer composition of the present embodiment contains, as the thermally dissociative blocking agent, the alkali metal phosphate-based thermally dissociative blocking agent (phosphate-based one) in the blocked polyisocyanate compound. The curing time thereof is in a time range of 20 to 180 seconds.

[Embodiment 3] <Blocked polyisocyanate composition> The blocked polyisocyanate composition according to the third embodiment is composed of the polyisocyanate compound and the ammonium carbonate-based thermally dissociative blocking agent that reacts with the polyisocyanate compound to be dissociated in a very low temperature. The blocked polyisocyanate composition synthesizes the blocked polyisocyanate compound by protecting the terminal isocyanate group of the polyisocyanate compound with the ammonium carbonate-based thermally dissociative blocking agent.

<Polyisocyanate compound> In this embodiment, as the polyisocyanate compound, the same ones as the first embodiment can be used.

<Thermally dissociative blocking agent> In this embodiment, as the thermally dissociative blocking agent, the ammonium carbonate-based thermally dissociative blocking agents are used. Specifically, the thermally dissociative blocking agent is one kind or a mixture of two or more kinds of the ammonium carbonate (($NH_4$)$_2$CO), the ammonium hydrogen carbonate ($NH_4HCO_3$), and the ammonium percarbonate (($NH_4$)$_2$CO$_4$).

<General formula of blocked polyisocyanate composition (compound)> General formulae of the blocked polyisocyanate composition (compound) of the present embodiment are molecular formulae shown in the following formulae (13) to (14), respectively, for each of the kinds of the aforementioned ammonium carbonate-based thermally dissociative blocking agents. (Only a case corresponding to the formula (1) is shown for each thermally dissociative blocking agent.) In these cases, as shown in the formulae (13) to (14), the carbonate group of each thermally dissociative blocking agent protects (blocks) the terminal isocyanate group (NCO group) of the polyisocyanate compound.

(Ammonium carbonate: $(NH_4)_2CO_3$)

$$-R-NHCO-CO_3^-.NH_4^+ + NH_4^+ \quad \text{General formula (13)}$$

(Ammonium bicarbonate: $NH_4HCO_3$)

$$-R-NHCO-CO_3^-.NH_4^+ \quad \text{General formula (14)}$$

<Addition amount of thermally dissociative blocking agent> The addition amount of the thermally dissociative blocking agent in the blocked polyisocyanate composition of the present embodiment (and compound) is the same as the blocked polyisocyanate composition of the first embodiment.

<Dissociation temperature of blocked polyisocyanate> The blocked polyisocyanate compound of the present embodiment uses the ammonium carbonate-based thermally dissociative blocking agent (carbonate-based one) as the thermally dissociative blocking agent. The thermal dissociation temperature thereof is in the temperature range of 80 to 150 degrees centigrade as described above.

<Manufacturing method of blocked polyisocyanate composition> The method for manufacturing the blocked polyisocyanate composition of the present embodiment is the same as the manufacturing method of the blocked polyisocyanate composition of the first embodiment. The conditions such as the kind of the polar organic solvent to be used, the amount of the polar organic solvent, the temperature of the aqueous solvent, and the like are the same as the conditions of the blocked polyisocyanate composition of the first embodiment.

<Blocked isocyanate prepolymer composition> The blocked isocyanate prepolymer composition of the present embodiment is a mixture of the block polyisocyanate compound synthesized from the blocked polyisocyanate composition and the polyisocyanate-reactive compound, as in the first embodiment. The blocked isocyanate prepolymer composition is characterized in that it is thermally cured by heating at a predetermined temperature. Here, the polyisocyanate-reactive compound can be similar to the polyisocyanate-reactive compound in the first embodiment.

<Method of manufacturing a blocked polyisocyanate prepolymer composition> The method for manufacturing the blocked polyisocyanate prepolymer composition of the present embodiment is the same as the manufacturing method of the blocked polyisocyanate prepolymer composition of the first embodiment. As in the first embodiment, it can be embodied as one of the resin type, the aqueous slurry type, and the aqueous dispersion type.

<Curing temperature of blocked isocyanate prepolymer composition> The curing temperature of the blocked isocyanate prepolymer composition of the present embodiment is equal to the dissociation temperature (that depends on the thermally dissociative blocking agent to be used) of the blocked polyisocyanate compound contained therein (that is, it is equal to the dissociation temperature of the ammonium carbonate-based thermally dissociative blocking agent (carbonate-based one) that is used as the thermally dissociative blocking agent in the present embodiment). It is in the temperature range of 80 to 150 degrees centigrade.

<Curing time of blocked isocyanate prepolymer composition> The blocked isocyanate prepolymer composition of the present embodiment contains, as the thermally dissociative blocking agent, the ammonium carbonate-based thermally dissociative blocking agent (carbonate-based one) in the blocked polyisocyanate compound. The curing time thereof is in a time range of 20 to 180 seconds.

[Embodiment 4] <Blocked polyisocyanate composition> The blocked polyisocyanate composition according to the third embodiment is composed of the polyisocyanate compound and the ammonium phosphate-based thermally dissociative blocking agent that reacts with the polyisocyanate compound to be dissociated in a very low temperature. The blocked polyisocyanate composition synthesizes the blocked polyisocyanate compound by protecting the terminal isocyanate group of the polyisocyanate compound with the ammonium phosphate-based thermally dissociative blocking agent.

<Polyisocyanate compound> In this embodiment, as the polyisocyanate compound, the same ones as the first embodiment can be used.

<Thermally dissociative blocking agent> In this embodiment, as the thermally dissociative blocking agent, the ammonium phosphate-based thermally dissociative blocking agents are used. Specifically, the thermally dissociative blocking agent is one kind or a mixture of two or more kinds of the ammonium phosphate $((NH_4)_3PO_4)$, the ammonium hydrogen phosphate $((NH_4)_2HPO_4)$, and the ammonium dihydrogen phosphate $(NH_4H_2PO_4)$.

<General formula of blocked polyisocyanate composition (compound)> General formulae of the blocked polyisocyanate composition (compound) of the present embodiment are molecular formulae shown in the following formulae (15) to (17), respectively, for each of the kinds of the aforementioned ammonium phosphate-based thermally dissociative blocking agents. (Only a case corresponding to the formula (1) is shown for each thermally dissociative blocking agent.) In these cases, as shown in the formulae (15) to (17), the phosphate group of each thermally dissociative blocking agent protects (blocks) the terminal isocyanate group (NCO group) of the polyisocyanate compound.

(Ammonium phosphate: $(NH_4)_3PO_4$)

$$-R-NHCO-PO_4^{2-}.2NH_4^+ + NH_4^+ \quad \text{General formula (15)}$$

(Ammonium hydrogen phosphate: $(NH_4)_2HPO_4$)

$$-R-NHCO-PO_4^{2-}.2NH_4^+ \quad \text{General formula (16)}$$

(Ammonium dihydrogen phosphate: $NH_4H_2PO_4$)

$$-R-NHCO-PO_4^{2-}.NH_4H^+ + H^+ \quad \text{General formula (17)}$$

<Addition amount of thermally dissociative blocking agent> The addition amount of the thermally dissociative blocking agent in the blocked polyisocyanate composition of the present embodiment (and compound) is the same as the blocked polyisocyanate composition of the first embodiment.

<Dissociation temperature of blocked polyisocyanate> The blocked polyisocyanate compound of the present embodiment uses the ammonium phosphate-based thermally dissociative blocking agent (phosphate-based one) as the thermally dissociative blocking agent. The thermal dissociation temperature thereof is in the temperature range of 80 to 150 degrees centigrade as described above.

<Manufacturing method of blocked polyisocyanate composition> The method for manufacturing the blocked polyisocyanate composition of the present embodiment is the same as the manufacturing method of the blocked polyisocyanate composition of the first embodiment. The conditions such as the kind of the polar organic solvent to be used, the amount of the polar organic solvent, the temperature of the aqueous solvent, and the like are the same as the conditions of the blocked polyisocyanate composition of the first embodiment.

<Blocked isocyanate prepolymer composition> The blocked isocyanate prepolymer composition of the present embodiment is a mixture of the block polyisocyanate compound synthesized from the blocked polyisocyanate composition and the polyisocyanate-reactive compound, as in the first embodiment. The blocked isocyanate prepolymer composition is characterized in that it is thermally cured by heating at a predetermined temperature. Here, the polyisocyanate-reactive compound can be similar to the polyisocyanate-reactive compound in the first embodiment.

<Method of manufacturing a blocked polyisocyanate prepolymer composition> The method for manufacturing the blocked polyisocyanate prepolymer composition of the present embodiment is the same as the manufacturing method of the blocked polyisocyanate prepolymer composition of the first embodiment. As in the first embodiment, it can be embodied as one of the resin type, the aqueous slurry type, and the aqueous dispersion type.

<Curing temperature of blocked isocyanate prepolymer composition> The curing temperature of the blocked isocyanate prepolymer composition of the present embodiment is equal to the dissociation temperature (that depends on the thermally dissociative blocking agent to be used) of the blocked polyisocyanate compound contained therein (that is, it is equal to the dissociation temperature of the ammonium phosphate-based thermally dissociative blocking agent (phosphate-based one) that is used as the thermally dissociative blocking agent in the present embodiment). It is in the temperature range of 80 to 150 degrees centigrade.

<Curing time of blocked isocyanate prepolymer composition> The blocked isocyanate prepolymer composition of the present embodiment contains, as the thermally dissociative blocking agent, the ammonium phosphate-based thermally dissociative blocking agent (phosphate-based one) in the blocked polyisocyanate compound. The curing time thereof is in a time range of 20 to 180 seconds.

WORKING EXAMPLE 1

Shown hereafter are a method for manufacturing a blocked polyisocyanate composition (manufacturing example) and a method for manufacturing a blocked polyisocyanate prepolymer composition (manufacturing example) according to the embodiment of the present invention, as well as a method for manufacturing a blocked polyisocyanate composition (manufacturing example) and a method for manufacturing a blocked polyisocyanate prepolymer composition (manufacturing example) according to a comparative example. The blocked polyisocyanate composition and the blocked polyisocyanate prepolymer composition according to the embodiment of the present invention as well as characteristic functions and effects thereof are described in a specific manner, while being compared with the blocked polyisocyanate composition and the blocked polyisocyanate prepolymer composition according to the comparative example. In the following, "parts" and "%" are "parts by weight" and "% by weight", unless otherwise specified.

COMPARATIVE EXAMPLE 1 a) First Step. First, 100 parts of ε-caprolactam was heated in an open reaction vessel to 90 degrees centigrade to be melted. Then, 100 parts of diphenylmethane diisocyanate (MDI) was gradually added therein over 1 hour, thereby obtaining a blocked polyisocyanate that was solid at a room temperature. A recovery rate of the blocked polyisocyanate was 90%.

b) Second Step. Next, 100 parts of the blocked polyisocyanate was mixed with 70 parts of a glucose, while 1 part of a tin octylate was added thereto. Then, it was pulverized for 1 hour in a ball mill to obtain a prepolymer resin of light brown. A recovery rate of the resin was 95%. As a result of observing a particle size distribution under a light microscope, a maximum particle size was below 20 micrometers.

COMPARATIVE EXAMPLE 2 a) First Step. First, 100 parts of a saturated sodium hydrogen sulfite solution (43%) and 20 parts of a dioxane were put in a separable flask equipped with a reflux condenser. Then, a temperature thereof was maintained at 20 degrees centigrade by a reflux condenser, while it was stirred at 1000 rpm.

b) Second Step. Next, 100 parts of a diphenylmethane diisocyanate (MDI) was gradually added into the separable flask over 1 hour, thereby obtaining a blocked polyisocyanate solution that was liquid at a room temperature. The blocked polyisocyanate solution was dried in a vacuum at 50 degrees centigrade, thereby obtaining a solid blocked polyisocyanate. A recovery rate of the blocked polyisocyanate was 90%.

c) Third Step. Next, a mixture of 100 parts of a blocked polyisocyanate and 70 parts of a glucose was pulverized for 1 hour in a ball mill, thereby obtaining a prepolymer resin of pale yellowish white. As a result of observing a particle size distribution under a light microscope, a maximum particle size was below 20 micrometers.

COMPARATIVE EXAMPLE 3 a) First Step. First, 100 parts of a saturated sodium hydrogen sulfite solution (43%) and 20 parts of an acetone were put in a separable flask equipped with a reflux condenser. Then, a temperature thereof was maintained at 20 degrees centigrade by a reflux condenser, while it was stirred at 1000 rpm.

b) Second Step. Next, 100 parts of a diphenylmethane diisocyanate (MDI) was gradually added into the separable flask over 1 hour, thereby obtaining a blocked polyisocyanate solution that was liquid at a room temperature. The blocked polyisocyanate solution was dried in a vacuum at 50 degrees centigrade, thereby obtaining a solid blocked polyisocyanate. A recovery rate of the blocked polyisocyanate was 93%.

c) Third Step. Then, a blocked polyisocyanate 100 parts of a mixture of a and 70 parts of glucose, ground 1 hour in a ball mill to obtain a resin prepolymer of pale yellowish white. As a result of observing a particle size distribution under a light microscope, a maximum particle size was below 20 micrometers.

WORKING EXAMPLE 1 a) First Step. First, 100 parts of a saturated sodium bicarbonate solution (57%) and 20 parts of a dioxane (as aprotic polar organic solvent) were put in a separable flask equipped with a reflux condenser. Then, a temperature thereof was maintained at 20 degrees centigrade by a reflux condenser, while it was stirred at 1000 rpm.

b) Second Step. Next, 100 parts of a diphenylmethane diisocyanate (MDI) was gradually added into the separable flask over 1 hour, thereby obtaining a blocked polyisocyanate solution that was liquid at a room temperature. The blocked polyisocyanate solution was dried in a vacuum at 60 degrees centigrade, thereby obtaining a solid blocked polyisocyanate. A recovery rate of the blocked polyisocyanate was 92%.

c) Third Step. Next, a mixture of 100 parts of a blocked polyisocyanate and 70 parts of a glucose was pulverized for 1 hour in a ball mill, thereby obtaining a prepolymer resin of pale yellowish white. As a result of observing a particle size distribution under a light microscope, a maximum particle size was below 20 micrometers.

WORKING EXAMPLE 2 a) First Step. First, 100 parts of a saturated sodium bicarbonate solution (57%) and 20 parts of an acetone (as aprotic polar organic solvent) (amphiphilic) were put in a separable flask equipped with a reflux condenser. Then, a temperature thereof was maintained at 20 degrees centigrade by a reflux condenser, while it was stirred at 1000 rpm.

b) Second Step. Next, 100 parts of a diphenylmethane diisocyanate (MDI) was gradually added into the separable flask over 1 hour, thereby obtaining a blocked polyisocyanate solution that was liquid at a room temperature. The blocked polyisocyanate solution was dried in a vacuum at 60 degrees centigrade, thereby obtaining a solid blocked polyisocyanate. A recovery rate of the blocked polyisocyanate was 95%.

c) Third Step. Next, a mixture of 100 parts of a blocked polyisocyanate and 70 parts of a glucose was pulverized for 1 hour in a ball mill, thereby obtaining a prepolymer resin of pale yellowish white. As a result of observing a particle size distribution under a light microscope, a maximum particle size was below 20 micrometers.

WORKING EXAMPLE 3 a) First Step. First, 100 parts of a saturated sodium bicarbonate solution (57%) and 20 parts of an acetone were put in a separable flask equipped with a reflux condenser. Then, a temperature thereof was maintained at 5 degrees centigrade by a reflux condenser, while it was stirred at 1000 rpm.

b) Second Step. Next, 100 parts of a diphenylmethane diisocyanate (MDI) was gradually added into the separable flask over 1 hour, thereby obtaining a blocked polyisocyanate solution that was liquid at a room temperature. The blocked polyisocyanate solution was dried in a vacuum at 60 degrees centigrade, thereby obtaining a solid blocked polyisocyanate. A recovery rate of the blocked polyisocyanate was 97%.

c) Third Step. Next, a mixture of 100 parts of a blocked polyisocyanate and 70 parts of a glucose was pulverized for 1 hour in a ball mill, thereby obtaining a prepolymer resin of pale yellowish white. As a result of observing a particle size distribution under a light microscope, a maximum particle size was below 20 micrometers.

WORKING EXAMPLE 4 a) First Step. First, 100 parts of a saturated disodium hydrogen phosphate solution (96%) and 20 parts of a dioxane (as aprotic polar organic solvent) were put in a separable flask equipped with a reflux condenser. Then, a temperature thereof was maintained at 20 degrees centigrade by a reflux condenser, while it was stirred at 1000 rpm.

b) Second Step. Next, 100 parts of a diphenylmethane diisocyanate (MDI) was gradually added into the separable flask over 1 hour, thereby obtaining a blocked polyisocyanate solution that was liquid at a room temperature. The blocked polyisocyanate solution was dried in a vacuum at 60 degrees centigrade, thereby obtaining a solid blocked polyisocyanate. A recovery rate of the blocked polyisocyanate was 90%.

c) Third Step. Next, a mixture of 100 parts of a blocked polyisocyanate and 70 parts of a glucose was pulverized for 1 hour in a ball mill, thereby obtaining a prepolymer resin of pale yellowish white. As a result of observing a particle size distribution under a light microscope, a maximum particle size was below 20 micrometers.

WORKING EXAMPLE 5 a) First Step. First, 100 parts of a saturated ammonium hydrogen carbonate solution (54%) and 20 parts of a dioxane (as aprotic polar organic solvent) were put in a separable flask equipped with a reflux condenser. Then, a temperature thereof was maintained at 20 degrees centigrade by a reflux condenser, while it was stirred at 1000 rpm.

b) Second Step. Next, 100 parts of a diphenylmethane diisocyanate (MDI) was gradually added into the separable flask over 1 hour, thereby obtaining a blocked polyisocyanate solution that was liquid at a room temperature. The blocked polyisocyanate solution was dried in a vacuum at 60 degrees centigrade, thereby obtaining a solid blocked polyisocyanate. A recovery rate of the blocked polyisocyanate was 95%.

c) Third Step. Next, a mixture of 100 parts of a blocked polyisocyanate and 70 parts of a glucose was pulverized for 1 hour in a ball mill, thereby obtaining a prepolymer resin of pale yellowish white. As a result of observing a particle size distribution under a light microscope, a maximum particle size was below 20 micrometers.

Comparison of Comparative Examples 1-3 and Working Examples 1-5

On Comparative Examples 1-3 and Working Examples 1-5, Table 1 shows a raw material to be used, a mixing ratio (parts by weight), a reaction temperature (maintaining temperature of the aqueous solvent during obtaining the blocked polyisocyanate solution from the first step to the second step (i.e. reaction temperature for obtaining the blocked polyisocyanate solution)), and a recovery rate thereof for manufacture of the blocked polyisocyanate composition (that are prepared in steps from the aforementioned first step to the second step).

TABLE 1

| Production of Blocked Polyisocyante | | Comparative Example 1 | Comparative Example 2 | Comparative Example 3 | Working Example 1 | Working Example 2 | Working Example 3 | Working Example 4 | Working Example 5 |
|---|---|---|---|---|---|---|---|---|---|
| Raw material to be used | MDI | 100 | 100 | 100 | 100 | 100 | 100 | 100 | 100 |
| | ε-caprolactam | 100 | | | | | | | |
| | Sodium hydrogen sulfite | | 42 | 42 | 42 | | | | |

TABLE 1-continued

| Production of Blocked Polyisocyante | | Comparative Example 1 | Comparative Example 2 | Comparative Example 3 | Working Example 1 | Working Example 2 | Working Example 3 | Working Example 4 | Working Example 5 |
|---|---|---|---|---|---|---|---|---|---|
| | Sodium bicarbonate | | | | 57 | 57 | 57 | | |
| | Disodium hydrogen phosphate | | | | | | | 96 | |
| | Ammonium hydrogen carbonate | | | | | | | | 54 |
| | Water | | 100 | 100 | 100 | 100 | 100 | 100 | 100 |
| | Dioxane | | 20 | | | | 20 | | |
| | Acetone | | | 20 | 20 | 20 | | | |
| Reaction temperature (° C.) | | 90 | 20 | 20 | 20 | 20 | 5 | 20 | 20 |
| Recovery rate (%) | | 95 | 90 | 93 | 92 | 95 | 97 | 90 | 95 |

On Comparative Examples 1 to 3 and Working Examples 1 to 5, Table 2 shows a raw material to be used, a mixing ratio (parts by weight), a maximum particle size, a curing temperature, a curing time, a result of occurrence of generated gas and odor at the time of manufacture or at the time of thermal curing for manufacture of the resin type of blocked isocyanate prepolymer composition (that is prepared in the third step). The curing temperature was a temperature when it reached an intrinsic viscosity with a temperature rise of 10 degrees centigrade per minute in a rheometer. Moreover, the curing time was a time from a start of viscosity increase until it reaches an intrinsic viscosity. Furthermore, FIG. 1 shows a curing characteristic in temperature rise of the resin type of blocked isocyanate prepolymer composition of Working Example 1 with the rheometer (vertical axis is Viscosity (mPa·s), the horizontal axis is Temperature (° C.). FIG. 2 is a copy of Table 1 and FIG. 3 is a copy of Table 2.

phosphate in Working Example 4), and the ammonium carbonate-based thermally dissociative blocking agent (ammonium hydrogen carbonate in Working Example 5), as the thermally dissociative blocking agent, react with the polyisocyanate compound (MDI of Working Examples 1 to 5) in the aqueous diameter solvent that was added with the polar organic solvent and that had the reaction temperature adjusted into the temperature range of 5 degrees centigrade to 20 degrees centigrade. Here, as the combination of the blocked polyisocyanate compound and the thermally dissociative blocking agent, Working Examples 1-3 use a combination of the MDI and the sodium hydrogen carbonate as the alkali metal carbonate-based thermally dissociative blocking agent, Working Example 4 uses a combination of the MDI and the disodium hydrogen phosphate as the alkali metal phosphate-based thermally dissociative blocking agent, and Working Example 5 uses the MDI and the ammonium hydrogen carbonate as the ammonium carbon-

TABLE 2

| Production of Prepolymer Resin | | Comparative Example 1 | Comparative Example 2 | Comparative Example 3 | Working Example 1 | Working Example 2 | Working Example 3 | Working Example 4 | Working Example 5 |
|---|---|---|---|---|---|---|---|---|---|
| Raw material to be used | Blocked polyisocyanate | 100 | 100 | 100 | 100 | 100 | 100 | 100 | 100 |
| | Glucose | 70 | 70 | 70 | 70 | 70 | 70 | 70 | 70 |
| Maximum particle size (μm) | | 20 | 20 | 20 | 20 | 20 | 20 | 20 | 20 |
| Curing temperature (° C.) | | 200 | 120 | 125 | 136 | 132 | 130 | 135 | 125 |
| Curing time (sec) | | 179 | 61 | 72 | 35 | 34 | 32 | 32 | 32 |
| Status of occurrence of odor at the time of manufacture | | ε-caprolactam odor | Sulfur dioxide gas odor | Sulfur dioxide gas odor | Odorless | Odorless | Odorless | Odorless | Odorless |
| States of occurrence of odor at the time of thermal curing | | ε-caprolactam odor | Odorless | Odorless | Odorless | Odorless | Odorless | Odorless | Odorless |

According to the experimental results for the blocked polyisocyanate compositions of Working Examples 1-5 of the present invention, it was confirmed that it was possible to manufacture the thermally dissociative blocking agent, which was capable of thermally dissociating in a low temperature range that was a temperature range equivalent to the aforementioned curing temperature (i.e. a low temperature range that is a temperature range of 125 degrees centigrade to 136 degrees centigrade but that is thought to be a temperature range of nearly about 120 degrees centigrade to about 140 degrees centigrade if considering errors or the like in the testing conditions or the measurement or the like), at a high recovery rate of 90% to 97% (i.e. 90% or more), by having the alkali metal carbonate-based thermally dissociative blocking agent (sodium hydrogen carbonate in Working Examples 1-3), the alkali metal phosphate-based thermally dissociative blocking agent (disodium hydrogen ate-based thermally dissociative blocking agent. However, similar effects can be expected even with the other combinations (i.e. even in case of using something other than the MDI as the blocked polyisocyanate compound and using something other than the sodium hydrogen carbonate or the disodium hydrogen phosphate or the ammonium hydrogen carbonate as the thermally dissociative blocking agent). Moreover, in Working Examples 1-5, there is no example that uses the ammonium phosphate-based thermally dissociative blocking agent as the thermally dissociative blocking agent. However, similar effects can be expected even in this case, too.

In particular, it was confirmed that, in Working Examples 1 to 5, it was possible to manufacture the thermally dissociative blocked isocyanate composition which was dissociable at a low temperature (as in the case where the curing temperature became 130 degrees centigrade), at the highest recovery rate of 97% (among Comparative Examples 1-3 and Working Examples 1-5), by reacting the MDI with the sodium hydrogen carbonate in the aqueous solvent with the acetone added as the polar organic solvent and adjusted to 5 degrees centigrade as in Working Example 3.

Moreover, it was confirmed that the resin type of blocked polyisocyanate prepolymer composition made by pulverizing 100 parts of the obtained (solid) blocked isocyanate and 70 parts of the glucose to 20 micrometers or less (i.e. the blocked polyisocyanate prepolymer compositions of Working Examples 1-5) completed curing in a tremendously short curing time such as 32 seconds to 35 seconds (that is thought to be a curing time in a time range of about 30 seconds at the shortest if considering errors or the like in the testing conditions or the measurement or the like and to be a curing time in a range of nearly about 30 seconds to about 40 seconds even on average) in the very low temperature range such as 125 degrees centigrade to 135 degrees centigrade (that is thought to be a temperature range of nearly about 120 degrees centigrade to about 140 degrees centigrade if considering errors or the like in the testing conditions or the measurement or the like).

In particular, in Working Example 3, it was confirmed that the resin type of blocked polyisocyanate prepolymer composition made by pulverizing 100 parts of the obtained (solid) blocked isocyanate and 70 parts of the glucose to 20 micrometers or less completed curing in a tremendously short curing time such as 32 seconds in the extremely low temperature of 130 degrees centigrade. Moreover, in Working Example 5, it was confirmed that the resin type of blocked polyisocyanate prepolymer composition made by pulverizing 100 parts of the obtained (solid) blocked isocyanate and 70 parts of the glucose to 20 micrometers or less completed curing in a tremendously short curing time such as 32 seconds in the still extremely lower temperature of 125 degrees centigrade.

[Generated gas and odor]. According to the experimental results on the generated gas and odor for the block polyisocyanate prepolymer compositions of Working Examples 1 to 5, it was confirmed that the generated gas at the time of production was only harmless carbon dioxide. Moreover, it was confirmed that the status of occurrence of the odor at the time of thermal curing was odorless in any of Working Examples 1-5.

[Diffusion amount of formaldehyde]. The present inventors measured an amount of diffusion of formaldehyde on a phenolic resin one day after a molding and a thermosetting plastic manufactured by the method of Working Example 3 in accordance with JIS_A1901. As a result, a detected aldehyde concentration was 0.035 (mg/m$^2$·65° C.·2 h) on the phenol resin, however, a value of the thermosetting plastic was 0.000 (mg/m$^2$·65° C.·2 h) and could not be detected. This value is lower than 0.005 (mg/m$^2$·65° C.·2 h) that is an industry standard in the strictest automotive interior parts, and it was available for all uses having a regulation.

[Color fastness]. The present inventors immersed a phenolic resin one day after a molding and a thermosetting plastic manufactured by the method of Working Example 3 in a caustic soda (50% solution) at ordinary temperature for 24 hours and observed a their change (resistance to discoloration against a sodium hydroxide solution that is a strongly-alkaline aqueous solution). As a result, significant discoloration was observed in the phenolic resin, however, no discoloration was observed in the thermosetting plastic of the present invention at all.

[Weather resistance (Solvent resistance)]. The inventors immersed a phenolic resin one day after a molding and a thermosetting plastic manufactured by the method of Working Example 3 in an acetone at ordinary temperature for 24 hours and observed a their change. However, no change was observed on both. Thus, it was confirmed that the thermosetting plastic of the present invention had a weather resistance (solvent resistance) equal to or higher than the phenolic resin.

INDUSTRIAL APPLICABILITY

The blocked polyisocyanate composition and the prepolymer composition of the present invention is applicable to heat insulation materials, plywoods, wooden boards, electrical products, automotive interior parts, or the like in which an insulation strength is required.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

The invention claimed is:

1. A blocked polyisocyanate composition synthesized from a polyisocyanate compound and a thermally dissociative blocking agent,
   characterized in that the thermally dissociative blocking agent is at least one kind of thermally dissociative blocking agent selected from a group consisting of a carbonate of an alkali metal, a hydrogen carbonate of an alkali metal, a percarbonate of an alkali metal, a phosphate of an alkali metal, a hydrogen phosphate salt of an alkali metal, a dihydrogen phosphate salt of an alkali metal, a carbonate of an ammonium, a hydrogen carbonate of an ammonium, a percarbonate of an ammonium, a phosphate of an ammonium, a hydrogen phosphate salt of an ammonium, and a dihydrogen phosphate salt of an ammonium.

2. A blocked polyisocyanate composition as recited in claim 1, characterized in that the thermally dissociative blocking agent is at least one kind of thermally dissociative blocking agent or a mixture of a group of two or more kinds of thermally dissociative blocking agents selected from a group consisting of a sodium carbonate, a potassium carbonate, an ammonium carbonate, a sodium hydrogen carbonate, a potassium hydrogen carbonate, an ammonium hydrogen carbonate, a sodium percarbonate, a potassium percarbonate, an ammonium percarbonate, a sodium phosphate, a potassium phosphate, an ammonium phosphate, a sodium hydrogen phosphate, a potassium hydrogen phosphate, an ammonium hydrogen phosphate, a sodium dihydrogen phosphate, a potassium dihydrogen phosphate, and an ammonium dihydrogen phosphate.

3. A blocked polyisocyanate composition as recited in claim 1, characterized in that an addition amount of the thermally dissociative blocking agent is 0.1 to 2.0 mol to 1 mol of the polyisocyanate compound in terms of an NCO group content.

4. A blocked polyisocyanate composition as recited in claim 1, characterized in that a dissociation temperature of the thermally dissociative blocking agent is in a range of 80 to 150 degrees centigrade.

5. A method for manufacturing the blocked polyisocyanate composition as recited in claim 1, in an aqueous mixed solvent combining a water with a polar organic solvent, characterized in that an addition amount of the polar organic solvent is in a range of 1 to 500 parts to 100 parts of the water in the aqueous mixed solvent.

6. A method for manufacturing a blocked polyisocyanate composition as recited in claim 5, characterized in that a temperature of the aqueous mixed solvent is in a temperature range of 0 to 80 degrees centigrade.

7. A prepolymer composition as a mixture of the blocked polyisocyanate composition as recited in claim 1 and a polyisocyanate-reactive compound reacting with the blocked isocyanate composition, characterized in that it is thermally cured by heating.

8. A prepolymer composition as recited in claim 7, characterized in that a curing temperature when thermally cured by heating is in a temperature range of 80 to 150 degrees centigrade.

9. A prepolymer composition as recited in claim 7, characterized in that a curing time when thermally cured by heating is in a time range of 20 to 180 seconds.

10. A thermally dissociative blocking agent for a blocked polyisocyanate composition for protecting an isocyanate group of a polyisocyanate compound, characterized in that it is composed of at least one kind of thermally dissociative blocking agent selected from a group consisting of a carbonate of an alkali metal, a hydrogen carbonate of an alkali metal, a percarbonate of an alkali metal, a phosphate of an alkali metal, a hydrogen phosphate salt of an alkali metal, a dihydrogen phosphate salt of an alkali metal, a carbonate of an ammonium, a hydrogen carbonate of an ammonium, a percarbonate of an ammonium, a phosphate of an ammonium, a hydrogen phosphate salt of an ammonium, and a dihydrogen phosphate salt of an ammonium.

* * * * *